(12) United States Patent
Lee et al.

(10) Patent No.: US 8,769,218 B2
(45) Date of Patent: *Jul. 1, 2014

(54) SYSTEM AND APPARATUS FOR FLASH MEMORY DATA MANAGEMENT

(71) Applicant: Siliconmotion Inc., Jhubei (TW)

(72) Inventors: Chun-Kun Lee, Jhubei (TW); Wei-Yi Hsaio, Jhubei (TW)

(73) Assignee: Siliconmotion Inc., Jhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/948,613

(22) Filed: Jul. 23, 2013

(65) Prior Publication Data

US 2013/0311713 A1    Nov. 21, 2013

Related U.S. Application Data

(63) Continuation of application No. 13/443,342, filed on Apr. 10, 2012, now Pat. No. 8,521,971, which is a continuation of application No. 13/069,937, filed on Mar. 23, 2011, now Pat. No. 8,219,764, which is a continuation of application No. 11/699,372, filed on Jan. 30, 2007, now Pat. No. 7,937,522.

(30) Foreign Application Priority Data

Nov. 20, 2006 (TW) ............................... 95142873 A

(51) Int. Cl.
*G06F 13/00* (2006.01)
*G06F 3/06* (2006.01)
*G06F 13/16* (2006.01)

(52) U.S. Cl.
CPC .............. *G06F 3/064* (2013.01); *G06F 3/0679* (2013.01); *G06F 3/0689* (2013.01); *G06F 13/1673* (2013.01)
USPC .......................................... 711/156; 711/103

(58) Field of Classification Search
CPC ..... G06F 3/064; G06F 3/0679; G06F 3/0689; G06F 13/1673
USPC .................................... 711/103, 156
See application file for complete search history.

(56) References Cited

U.S. PATENT DOCUMENTS

| | | |
|---|---|---|
| 5,388,083 A | 2/1995 | Assar et al. |
| 5,479,638 A | 12/1995 | Assar et al. |
| 5,485,595 A | 1/1996 | Assar et al. |
| 5,640,349 A | 6/1997 | Kakinuma et al. |
| 6,016,472 A | 1/2000 | Ali |
| 6,076,137 A | 6/2000 | Asnaashari |
| 6,115,289 A | 9/2000 | Sin |

(Continued)

*Primary Examiner* — Reba I Elmore
(74) *Attorney, Agent, or Firm* — Ditthavong & Steiner, P.C.

(57) ABSTRACT

The system and apparatus for managing flash memory data includes a host transmitting data, wherein when the data transmitted from the host have a first time transmission trait and the address for the data indicates a temporary address, temporary data are retrieved from the temporary address to an external buffer. A writing command is then executed and the temporary data having a destination address are written to a flash memory buffer. When the flash memory buffer is not full, the buffer data are written into a temporary block of the flash memory. The writing of buffer data into the temporary block includes using an address changing command, or executing a writing command to rewrite the external buffer data to the flash memory buffer so that the data are written into the temporary block.

16 Claims, 6 Drawing Sheets

(56) References Cited

U.S. PATENT DOCUMENTS

| | | |
|---|---|---|
| 6,381,176 B1 | 4/2002 | Kim et al. |
| 6,662,314 B1 | 12/2003 | Iwata et al. |
| 6,704,835 B1 | 3/2004 | Garner |
| 6,754,765 B1 | 6/2004 | Chang et al. |
| 6,760,805 B2 | 7/2004 | Lasser |
| 6,775,698 B1 | 8/2004 | Simone |
| 6,831,865 B2 | 12/2004 | Chang et al. |
| 7,089,349 B2 | 8/2006 | Chang et al. |
| 7,107,389 B2 | 9/2006 | Inagaki et al. |
| 7,170,856 B1 | 1/2007 | Ho et al. |
| 7,467,251 B2 | 12/2008 | Park et al. |
| 7,937,522 B2 * | 5/2011 | Lee et al. ............ 711/103 |
| 8,219,764 B2 * | 7/2012 | Lee et al. ............ 711/156 |
| 8,300,465 B2 * | 10/2012 | Jeon et al. ............ 365/185.11 |
| 8,521,971 B2 * | 8/2013 | Lee et al. ............ 711/156 |
| 2003/0124975 A1 | 7/2003 | Ram et al. |
| 2004/0049627 A1 | 3/2004 | Piau et al. |
| 2004/0193786 A1 | 9/2004 | Inagaki et al. |
| 2005/0204187 A1 | 9/2005 | Lee et al. |
| 2006/0036897 A1 | 2/2006 | Lin et al. |
| 2007/0186033 A1 | 8/2007 | Shinagawa et al. |
| 2007/0207800 A1 | 9/2007 | Daley et al. |
| 2007/0226452 A1 | 9/2007 | Wu et al. |
| 2007/0283428 A1 | 12/2007 | Ma et al. |

\* cited by examiner

SYSTEM AND APPARATUS FOR FLASH MEMORY DATA MANAGEMENT

RELATED APPLICATIONS

This application is a Continuation application of U.S. application Ser. No. 13/443,342 filed on Apr. 10, 2012, which is a Continuation application of U.S. application Ser. No. 13/069,937 filed on Mar. 23, 2011, now U.S. Pat. No. 8,219,764, which is a Continuation application of U.S. application Ser. No. 11/699,372 filed on Jan. 30, 2007, now U.S. Pat. No. 7,937,522 which claims the right of priority based on Taiwan Application Serial Number 95142873, filed Nov. 20, 2006, the disclosure of which is hereby incorporated by reference herein in its entirety.

BACKGROUND OF THE INVENTION

1. Field of Invention

The invention relates to memory data management and, in particular, to a data writing method for managing flash memory data.

2. Related Art

Flash memory is a kind of storage system with the advantages of high access speed and high stability. It is non-volatile memory. That is, once data are stored in the flash memory, it no longer needs power to maintain the data.

The structure of the flash memory is in units of blocks. Each block is further divided into pages or sections. If data need to be written into the flash memory, a data writing command is executed to write data in an external buffer into the buffer of the flash memory before writing it into the flash memory. Under the condition that NOP is 1, the data in the memory page can be only written once. In practice, it is likely to occur that data cannot fully occupy a flash memory block or the data storage is not continuous. In these cases, the storage efficiency of the flash memory is reduced. Data defragmentation is employed to solve this problem. However, it requires a lot of time to reorganize data in the flash memory. In particular, once a destination address of the external buffer is assigned to the data, the current structure does not allow one to change the destination address of the data already stored in the flash memory buffer or read the data out of the flash memory buffer. Moreover, such a structure is not suitable for speeding up the data defragmentation.

It is therefore desirable to provide a new method for flash memory data management to prevent from spending a lot of time re-organizing data therein because of loose or discontinuous data distribution. The data storage ability of the flash memory is better optimized by reducing the dependence on the external buffer.

SUMMARY OF THE INVENTION

An objective of the invention is to provide a method for flash memory data management to reduce the amount of time for re-organizing data therein because of loose or discontinuous data distribution, thereby increasing the data storage efficiency thereof.

In accord with the above-mentioned objective, the invention provides a method for flash memory data management comprising the steps of: (a) writing data in an external buffer to a flash memory buffer, wherein the data in the flash memory buffer has a destination address; and (b) checking the data stored in the flash memory buffer and using an address changing command to assign a temporary address to the data stored in the flash memory buffer and to write the data into the temporary block when the flash memory buffer is not full.

In accord with the above-mentioned objective, the invention provides a method for flash memory data management comprising the steps of: (a) writing data in an external buffer to a flash memory buffer, wherein the data in the flash memory buffer has a destination address; and (b) checking the data stored in the flash memory buffer and using an address changing command when the flash memory buffer is not full, wherein the writing command deletes the data in the flash memory buffer and re-assigns an temporary address to the data; (c) writing the data in the external buffer to the flash memory buffer, wherein the data in the flash memory buffer has a temporary address; and (d) writing the data to a temporary block according to the temporary address.

In accord with the above-mentioned objective, the invention provides a method for flash memory data management comprising the steps of: (a) determining an address for transmitting data by a host, wherein the address is an original destination address; (b) waiting for the host to transmit the data to an external buffer; (c) determining whether the data in the external buffer have a first time transmission trait and, when they have the first time transmission trait, determining whether the address assigned by the host is a temporary address and, when the assigned address is a temporary address, reading temporary data in the temporary address to the external buffer, and executing a writing command to re-assign a new destination address; (d) writing the temporary data in the external buffer to a flash memory buffer; and (e) writing the data transmitted from the host in the external buffer to the flash memory buffer, wherein the data in the flash memory buffer have the original or new destination address.

If the data in the external buffer do not have the first time transmission trait, then step (e) is executed directly. When the data in the external buffer have the first time transmission trait and the host assigned data transmission address is not the temporary address, an algorithm is executed, followed by step (e). The algorithm includes organizing the data in the external buffer so that they become continuous.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

The disclosed method for flash memory data management writes data into a destination block when a flash memory buffer is full and into a temporary block when it is not full. Another method for flash memory data management according to the invention is for the case when data transmitted from a host have a first time transmission trait and the writing address of the data is a temporary address. In this case, temporary data are read to the external buffer and a writing command is executed to write the temporary data with a destination address to the flash memory buffer. Therefore, the invention can reduce the loose or discontinuous data distribution and the amount of time for re-organizing flash memory data. Moreover, it reduces the dependence on the external buffer to increase the data storage ability thereof.

Figure 1:
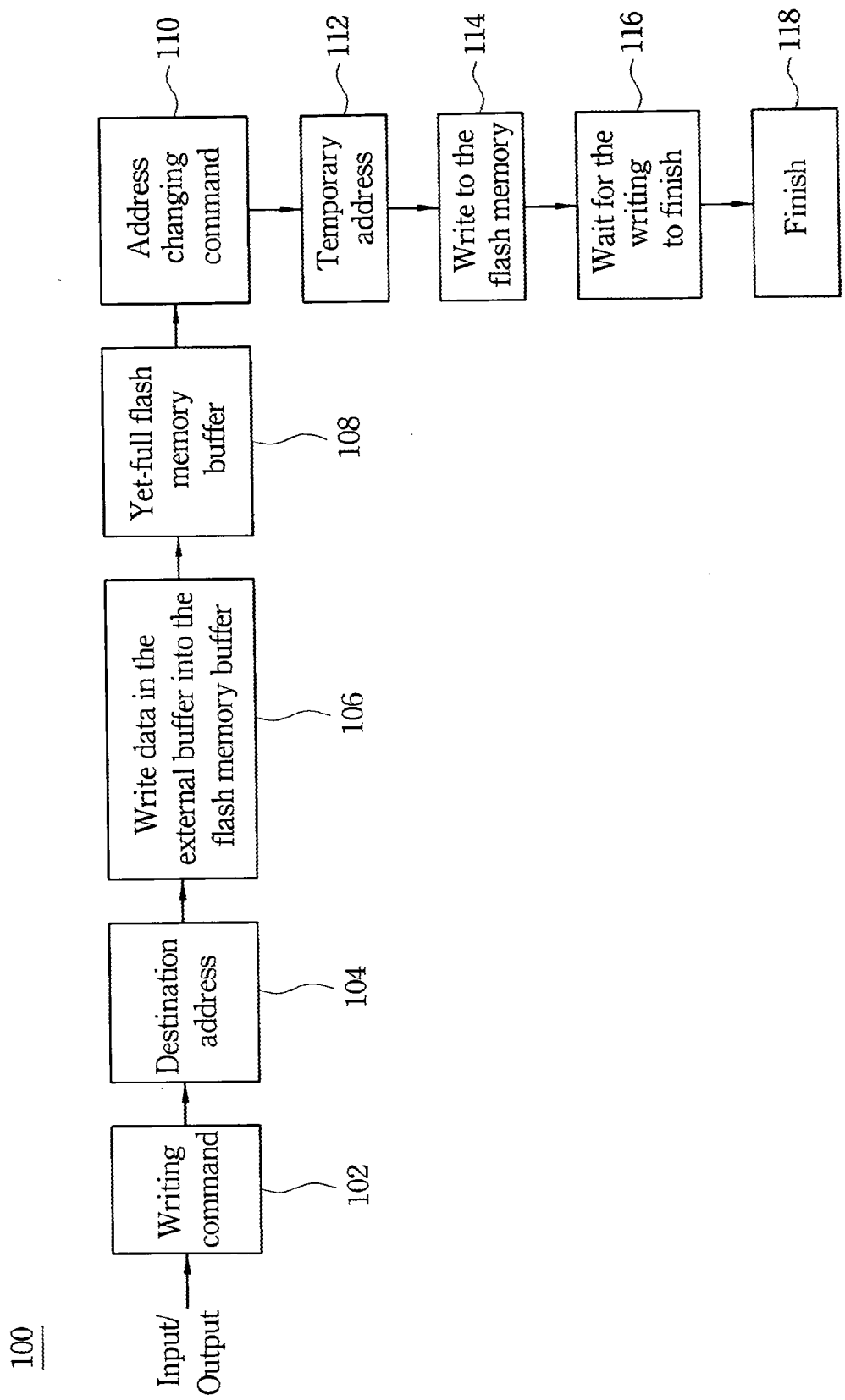
FIG. 1 is a schematic view showing the flowchart of an embodiment of the invention.

The procedure of an embodiment of the invention is depicted in FIG. 1. Steps 102 and 104 takes a data writing command and a data address (e.g., using 5 cycles to transmit data with a destination address), respectively. They are used to write data in an external buffer to a flash memory buffer (step 106). The written data has a destination address. Step 108 checks the data stored in the flash memory buffer. When the flash memory buffer is not fill, an address changing command is used (step 110) to assign a temporary address to the data in the flash memory buffer (step 112). The data are then written to a temporary block of the flash memory (step 114). Steps 116 and 118 complete writing the data.

Figure 2:
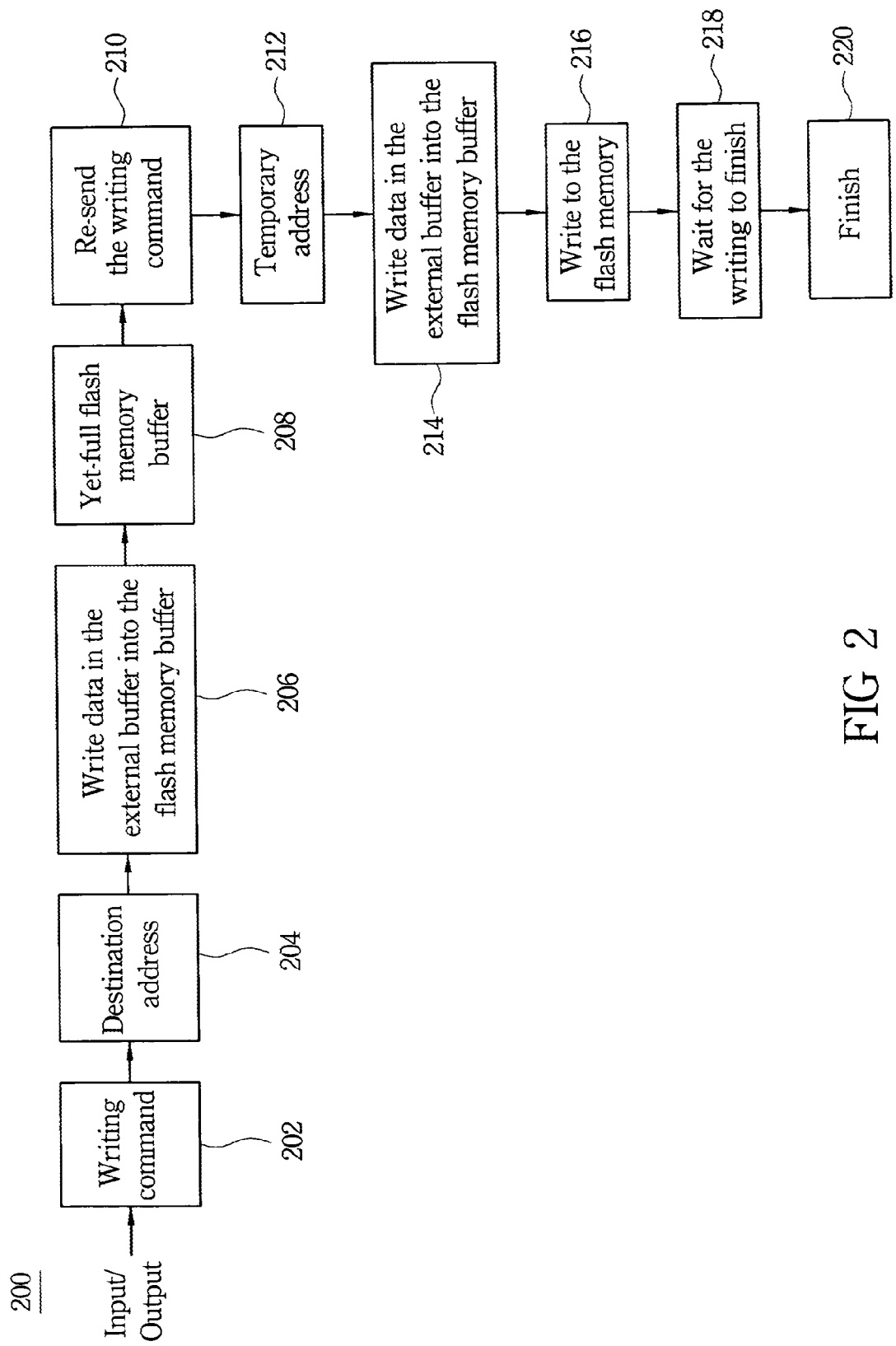
FIG. 2 is a schematic view showing the flowchart of another embodiment of the invention.

With reference to FIG. 2, steps 202 and 204 take a data writing command and a data address (e.g., using 5 cycles to transmit data with a destination address), respectively. They are used to write data in an external buffer to a flash memory buffer (step 206). The written data has a destination address. Step 208 checks the data stored in the flash memory buffer. When the flash memory buffer is not full, step 210 executes a writing command. The writing command deletes the data inside the flash memory buffer and re-assigns a temporary address to the data in the flash memory buffer (step 212). Step 214 re-writes the data in the external buffer to the flash memory buffer. The data in the flash memory buffer has the temporary address. Step 216 writes the data to a temporary block of the flash memory according to the temporary address. Steps 218 and 220 complete writing the data.

Figure 3:
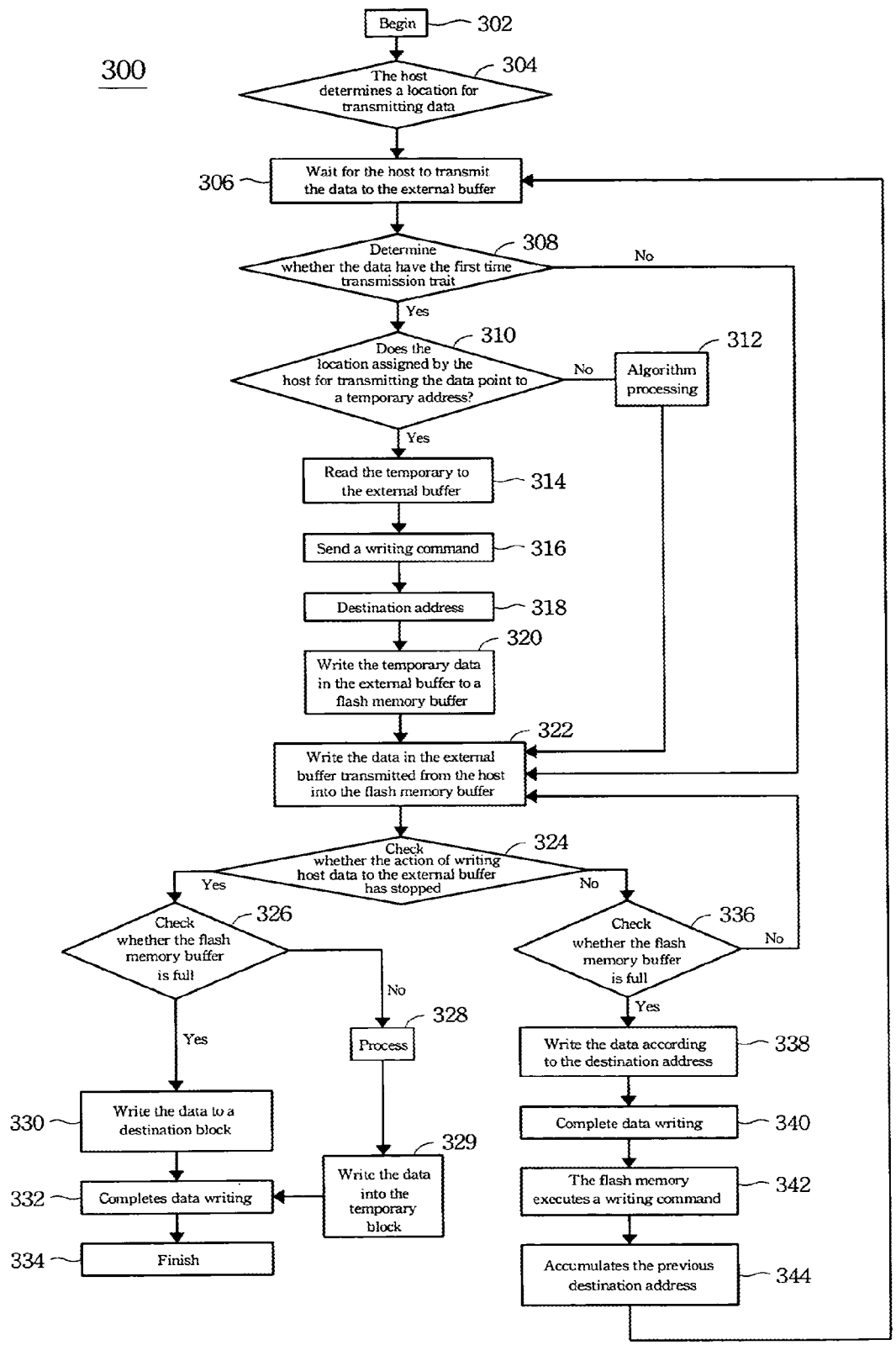
FIG. 3 is a schematic view showing the flowchart of yet another embodiment of the invention.

Please refer to FIG. 3. In step 304, a host determines a location for transmitting data. The location is an original destination address. Step 306 waits for the host to transmit the data to an external buffer. Step 308 determines whether the data in the external buffer has the first time transmission trait. Step 310 determines whether the location assigned by the host for transmitting the data is pointed to a temporary address. In step 314, when the location assigned by the host for transmitting data points to the temporary address, then temporary data in the temporary address are read to the external buffer. Afterwards, steps 316 and 318 execute a writing command for re-assigning an address as a new destination address. Step 320 writes the temporary data in the external buffer to a flash memory buffer. Step 322 writes the data in the external buffer transmitted from the host into the flash memory buffer. The data in the flash memory buffer has the original destination address or the new destination address.

More explicitly, in step 308, when the data in the external buffer do not have the first time transmission trait, step 322 is executed directly to write the data in the external buffer transmitted from the host into the flash memory buffer. Alternatively, if in step 308 the data of the external buffer have the first time transmission trait and the location assigned by the host for data transmission in step 310 does not point to a temporary address, then step 312 executes algorithm to organize the data in the external buffer so that they become continuous. Afterwards, step 322 is performed to write the data in the external buffer transmitted from the host to the flash memory buffer.

After the data transmitted from the host to the external buffer are written into the flash memory buffer, step 324 checks whether the action of writing host data to the external buffer has stopped. After it is stopped, step 326 checks whether the flash memory buffer is full. When it is full, step 330 is performed to write data with a destination address to a destination block. The destination address is either the original destination address or the new destination address. If the flash memory buffer is found to be not full in step 326, step 328 assigns a temporary block to the data. Step 329 writes the data to the temporary block. Step 332 completes writing data to the flash memory. Step 334 finishes the data writing to the flash memory.

Step 328 involves the disclosed method of moving data in the yet full flash memory buffer to the temporary block. As shown in FIG. 1, when the flash memory buffer is not full, an address changing command is used to assign a temporary address to the data in the flash memory buffer, writing the data to the temporary block. Alternatively, as shown in FIG. 2, if the flash memory buffer is not full, a writing command is executed. The writing command deletes the data inside the flash memory buffer and re-assigns a temporary address. The data in the external buffer are then written into the flash memory buffer. The data inside the flash memory buffer have a temporary address and are written into the temporary block accordingly.

After writing the data transmitted from the host to the external buffer into the flash memory buffer, step 324 checks whether the action of writing the host data to the external buffer has been stopped. If the writing is not over yet, step 336 checks the data stored in the flash memory buffer. If the flash memory buffer is full, then step 338 writes the data according to their destination address to a destination block. Step 340 completes writing the data to the destination block. In step 342, the flash memory executes a writing command. Step 344 accumulates the destination address (e.g., accumulating the previous writing address). Afterwards, the procedure goes to step 306, followed by the above-mentioned steps. The destination address is either the original destination address of the new destination address.

When the data are still being transmitted from the host to the external buffer, step 336 checks the data stored in the flash memory buffer. If the flash memory buffer is not full, the procedure goes to step 322 to write the data transmitted from the host to the external buffer into the flash memory buffer.

Figure 4:
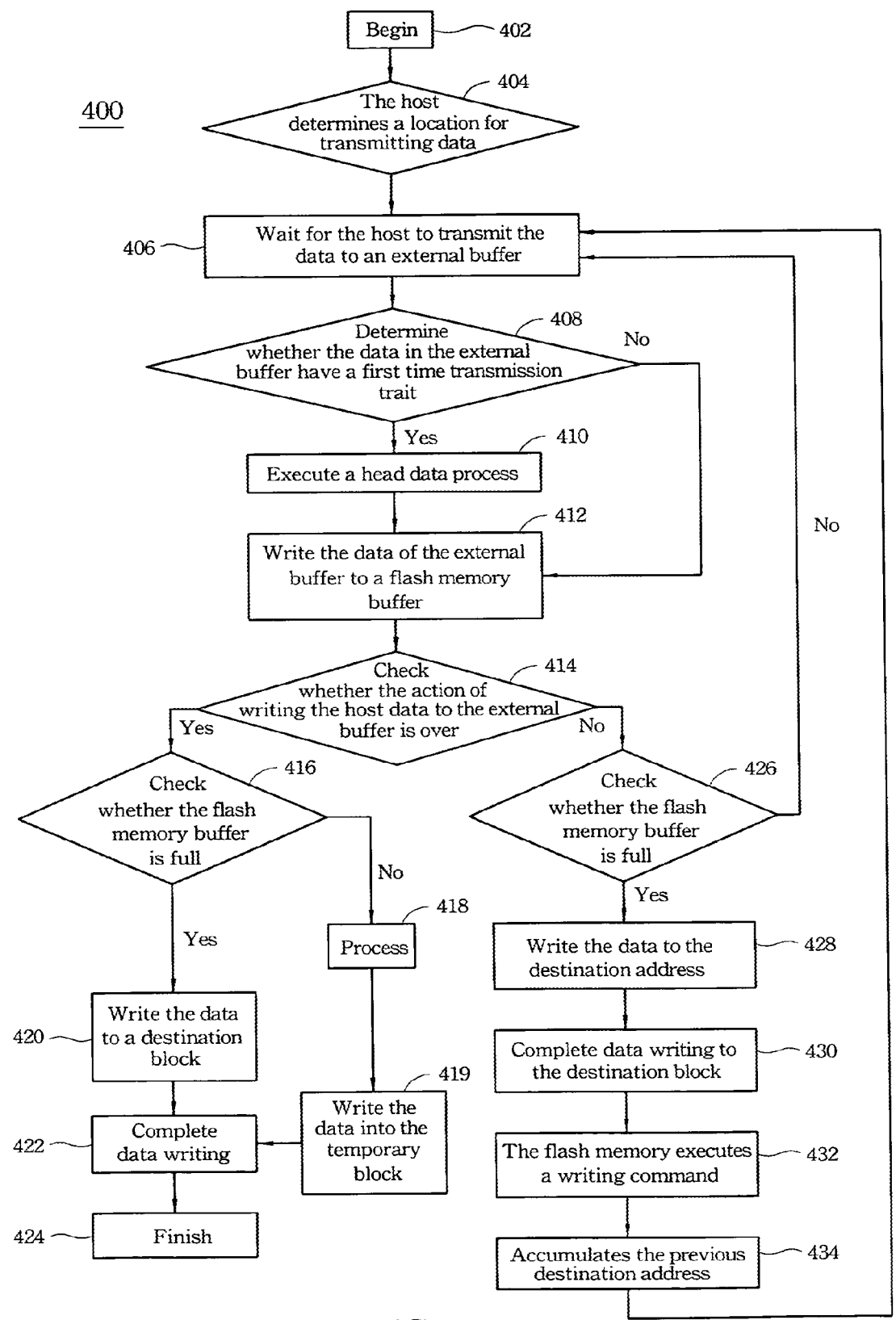
FIG. 4 is a schematic view showing the application of the invention according to the flowchart of FIG. 1 or FIG. 2.

As shown in flowchart 400 of FIG. 4, a host determines a location for transmitting data (e.g. a continuous series of data) in step 404. The location is a destination address. Step 406 waits for the host to transmit the data to an external buffer. Step 408 determines whether the data in the external buffer have a first time transmission trait. If the data have the first time transmission trait, step 410 executes a head data process to simplify subsequent data accesses. Step 412 writes the data of the external buffer to a flash memory buffer. The data in the flash memory buffer has a destination address.

After the host transmits the data to the external buffer, the procedure determines whether the data have the first time transmission trait. If the data do not have the first time transmission trait, step 412 is directly performed to write the data in the external buffer into the flash memory buffer.

Step 414 checks whether the action of writing the host data to the external buffer is over. If it is not over, then step 426 checks the data stored in the flash memory buffer. Once the flash memory buffer is full, step 428 writes the data according to the destination address to a destination block. Step 430 completes writing the data to the destination block. In step 432, the flash memory executes a writing command. Step 434 accumulates the destination address (e.g., accumulating the previous writing address). Afterwards, the procedure goes back to step 406, followed by the above-mentioned steps.

When the data are still being written to the external buffer and the flash memory buffer is not full in step 426, the procedure goes back to step 406 to continue the above-mentioned steps.

Step 414 checks whether the action of writing the host data to the external buffer is over. When it is over, step 416 checks the data stored in the flash memory buffer. Once the flash memory buffer is full, step 420 is executed to write the data with the destination address into a destination block.

Once the action of writing the host data into the external buffer is over and the flash memory buffer is found to be not full in step 416, then step 418 assigns a temporary block to the data. The data are written into the temporary block in step 419. Step 422 completes writing the data into the flash memory. Step 424 finishes the action of writing the data to the flash memory.

Step 418 involves the disclosed method of moving the data in the yet full flash memory buffer into the temporary block. As illustrated in FIG. 1, when the flash memory buffer is not full, an address changing command is used to assign a temporary address to the data in the flash memory buffer for writing the data to the temporary block. Alternatively, as shown in FIG. 2, when the flash memory buffer is not full, a writing command is executed. The writing command deletes the data stored in the flash memory buffer and re-assigns a temporary address. The data in the external buffer are then written to the flash memory buffer. The data in the flash memory buffer has a temporary address and are written into the temporary buffer accordingly.

Figure 5:
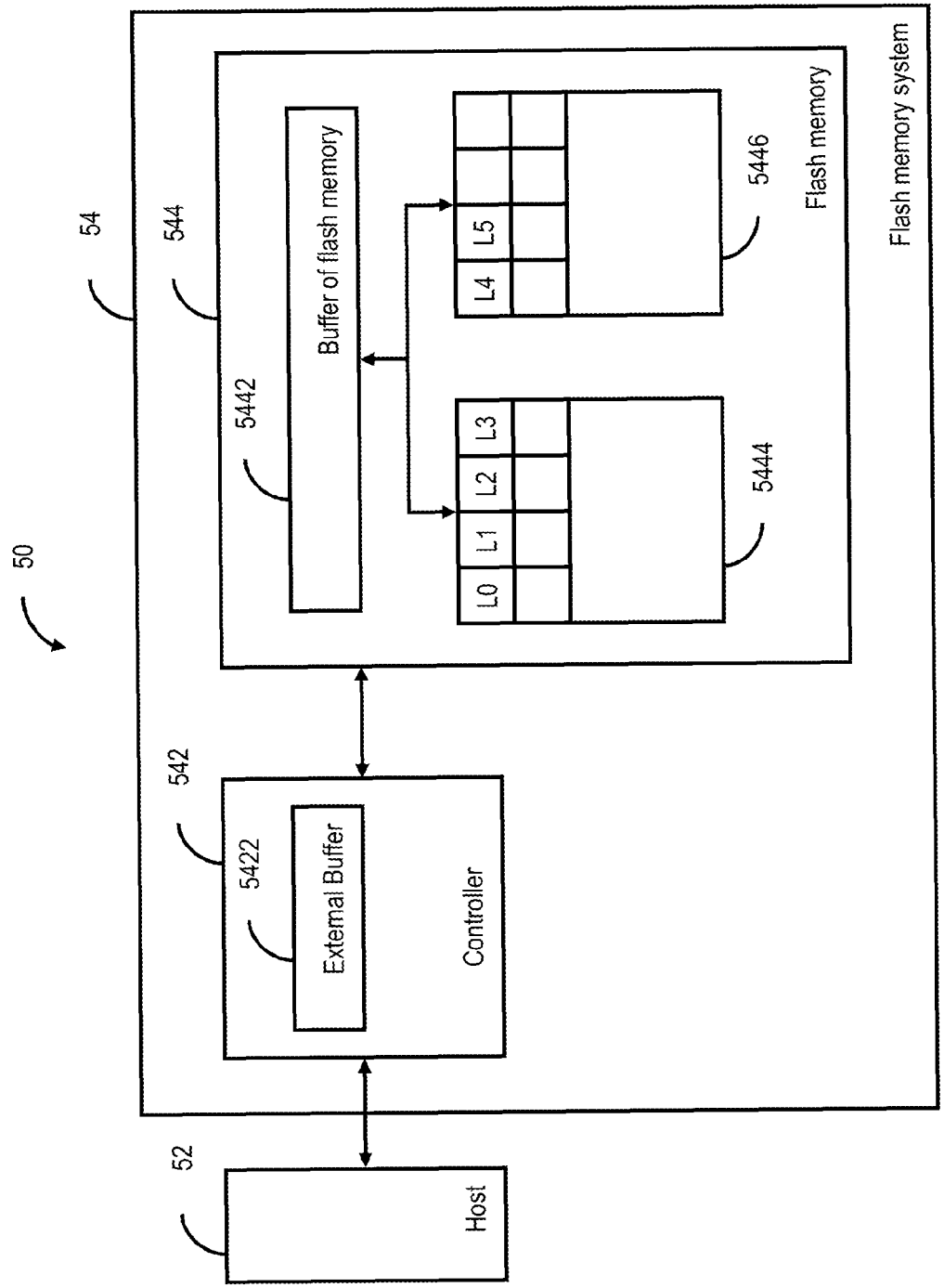
FIG. 5 is a block diagram of a flash memory system, which may be employed to implement the methods depicted in the flowcharts of FIGS. 1 and 2, according to the invention.

FIG. 5 shows a block diagram of flash memory system 54 of the invention, which is coupled to a host 52. The flash memory system 54 comprises a controller 542 and a flash memory 544. The controller 542 comprises an external buffer 5422, the external buffer 5422 being external to flash memory 544. The flash memory 544 comprises a buffer 5442 and two blocks called destination block 5444 and temporary block 5446. Each block comprises a plurality of pages and each page includes four sectors (512 byte/sector). In addition, the destination block 5444 stores four sectors of data L0-L3.

FIG. 5 is a block diagram descriptively depicting structure to perform the methods depicted in the flow diagrams of FIGS. 1 and 2. The host would like to write 2 sectors of data from logical address 4 to logical address 5 (L4~L5). The controller 542 receives a write command and data from the host 52 (step 102 and step 104), then keeps the data in the external buffer 5422. When the write command is interpreted, the controller 542 transmits/moves/writes data in the external buffer 5422 to buffer of flash memory 5442 (step 106), the written data (L4-L5) has a destination address corresponding to the destination block 5444. The controller 542 checks the buffer of flash memory 5442 is not full (step 108), the controller 542 uses an address changing command (step 110) to assign a temporary address to the data in the buffer of flash memory 544 (step 112). The data L4-L5 are then written to a temporary block 5446 of the flash memory 544 (step 114). Steps 116 and 118 complete writing the data.

According to another embodiment of this invention, wherein the structure of FIG. 5 may be used to implement the method depicted in the flowchart of FIG. 2, the host would like to write two sectors of data from logical address 4 to logical address 5 (L4-L5). The controller 542 receives a write command and data from the host 52 (step 202 and step 204), then keeps the data in the external buffer 5422. When the write command is interpreted, the controller 542 transmits/moves/writes data in the external buffer 5422 to buffer of flash memory 5442 (step 206), the written data (L4-L5) has a destination address corresponding to the destination block 5444. The controller 542 checks that the buffer of flash memory 5442 is not full (step 208) and, if that is the case, the controller 542 resends a writing command (step 210). The writing command deletes the data in the buffer of flash memory 5442 and re-assigns a temporary address corresponding to the temporary block 5446 (step 212). Then, the controller re-writes the data L4-L5 in the external buffer 5422 to the buffer of the flash memory 5442 (step 214). The data L4-L5 are then written to a temporary block 5446 of the flash memory 544 (step 216). Steps 218 and 220 complete writing the data.

Figure 5A:
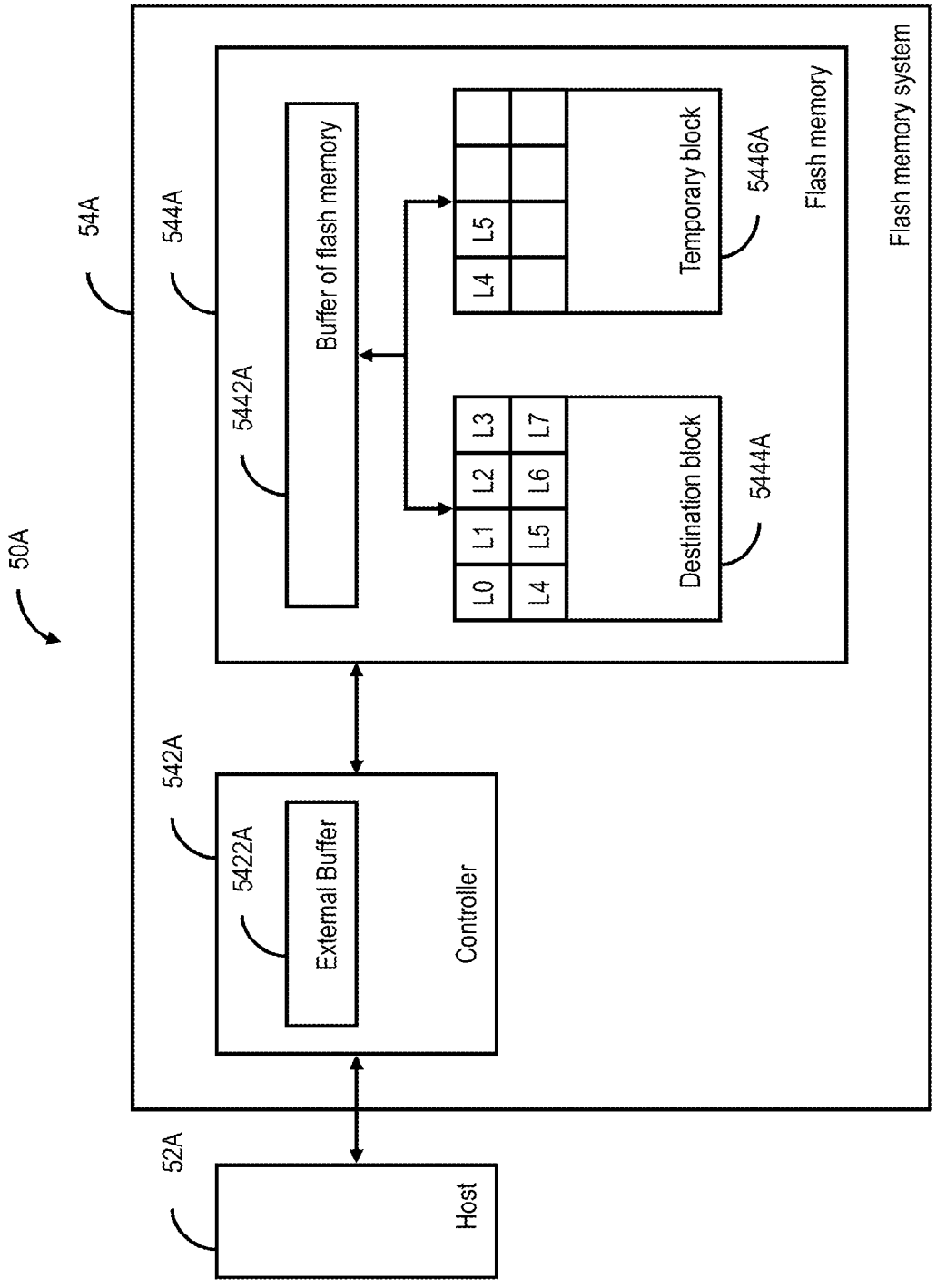
FIG. 5A is a block diagram of a flash memory system, which may be employed to implement the method depicted in the flowcharts of FIG. 3, according to the invention.

FIG. 5A shows a block diagram of flash memory system 54A of this invention, which is coupled to a host 52A. The flash memory system 54A comprises a controller 542A and a flash memory 544A. The controller 542A comprises an external buffer 5422A, external to flash memory 544A. The flash memory 544A comprises a buffer 5442A and two blocks called destination block 5444A and temporary block 5446A. In addition, the destination block 5444A stores four sectors of data L0-L3 and the temporary block 5446A stores two sectors of data L4-L5.

FIG. 5A is a block diagram descriptively depicting structure to perform the method depicted in the flow diagram of FIG. 3. The host now would like to write two sectors of data from logical address 6 to logical address 7 (L6-L7) (step 302). The controller 542A receives a write command and data from the host 52A (step 304 and step 306), then keeps the data in the external buffer 5422A. The controller 542A determines the sector of data L6-L7 is first transmitted (step 308) and also the address of data sector L6-L7 is pointed to the temporary block 5446A (step 310). Then, the controller 542A reads data sector L4-L5 from the temporary block 5446A to the external buffer 5422A (step 314). Afterwards, the controller 542A executes a writing command for re-assigning a new destination address corresponding to the destination block 5444A (steps 316 and 318). The controller 542A transmits/writes/moves the data sector L4-L7 from the external buffer 5422A to the buffer of flash memory 5442A (step 320 and step 322). After the data sector L6-L7 transmitted from the host 52A to the external buffer 5422A are written into the buffer of flash memory 5442A, the controller 542A checks whether the action of host 52A has stopped (step 324). After it is stopped, the controller 542A checks whether the buffer of flash memory 5442A is full (step 326). When it is full, the controller 542A would instruct the flash memory 544A to program data L4-L7 to the destination address of the destination block 5444A (step 330). When the flash memory 544A completes programming, it informs the controller 542A (step 332) and then the controller 542A informs the host 52 that the process is finished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for managing flash memory data, comprising:

a flash memory including a flash memory buffer, a first block, and a second block; and a controller, external to the flash memory, comprising an external buffer;
wherein the controller is configured to receive a write command and data having a first address corresponding to the first block, and store the data in the external buffer; and
wherein the controller is further configured to determine if a data length of the data is not less than a page size of a page of the first block and, if the data length of the data is less than the page size of the page of the first block, the controller is configured to cause the data to be written to the second block.

2. The apparatus of claim 1, wherein the controller is configured to receive the write command and the data having a first address from a host external to the apparatus.

3. The apparatus of claim 1, wherein the data is written to the second block responsive to assignment of a second address, within the flash memory buffer, to the data by the controller.

4. The apparatus of claim 1, wherein when the data length of the data is not less than the page size of the page of the first block, the controller is configured to cause the data to be written to the first block in accordance with the first address.

5. The apparatus of claim 2, wherein the controller is configured to determine whether storage of data from the host in the external buffer has stopped and the controller is further configured to determine if the data length of the data is less than the page size of the page of the first block responsive to the determination that storage of data from the host to the external buffer has stopped.

6. The apparatus of claim 2, wherein the controller is configured to determine whether storage of data from the host in the external buffer has stopped while the data is still being stored in the external buffer, determine whether the data length of the data is less than the page size of the page of the first block, and cause the data to be written to the second block if the data length of the data is less than the page size of the page of the first block.

7. The apparatus of claim 6, wherein when the data are still being stored in the external buffer and the data length of the data is not less than the page size of the page of the first block, the controller is configured to cause the data to be written into the first block within the flash memory according to the first address, and when the data are completely written to the first block, the flash memory is configured to execute a write command and accumulate the first address.

8. The apparatus of claim 1, wherein the controller is configured to cause the data to be written to the second block by mean of sending or transmitting an address change command.

9. The apparatus of claim 1, wherein the controller is configured to cause the data to be written to the second block by mean of sending or transmitting a second write command.

10. The apparatus of claim 9, wherein the second write command causes an operation for deleting data in the flash memory buffer if the data is already in the flash memory buffer.

11. A method for managing flash memory data to be stored in a memory device, wherein the memory device comprises a flash memory including a flash memory buffer, a first block, and a second block and a controller, external to the flash memory, comprising an external buffer, the method comprising:
receiving a write command and data having a first address corresponding to the first block by the controller; and
storing the data in the external buffer by the controller,
wherein the controller is further configured to determine if a data length of the data is not less than a page size of a page of the first block and, if the data length of the data is less than the page size of the page of the first block, the controller is configured to cause the data to be written to the second block.

12. The method of claim 11, wherein the controller is configured to receive the write command and the data having a first address from a host external to the memory device.

13. The apparatus of claim 11, wherein the controller is configured to cause the data to be written to the second block by mean of sending or transmitting an address change command.

14. The apparatus of claim 11, wherein the controller is configured to cause the data to be written to the second block by mean of sending or transmitting a second write command.

15. The apparatus of claim 11, wherein the second write command causes an operation for deleting data in the flash memory buffer if the data is already in the flash memory buffer.

16. The method of claim 11, wherein the data is written to the second block responsive to assignment of a second address, within the flash memory buffer, to the data by the controller.

* * * * *